(151.)

CALVERT B. COTTRELL.

Improvement in Pistons for Printing Presses.

No. 4,776. Reissued March 5, 1872.

Witnesses:

A Bennewendorf.

Francis McAuliffe

Inventor:

C. B. Cottrell.

PER

Attorneys.

UNITED STATES PATENT OFFICE.

CALVERT B. COTTRELL, OF WESTERLY, RHODE ISLAND.

IMPROVEMENT IN PISTONS FOR PRINTING-PRESSES.

Specification forming part of Letters Patent No. 121,759, dated December 12, 1871; reissue No. 4,776, dated March 5, 1872

Specification describing a new and useful Improvement in Printing-Presses, invented by CALVERT B. COTTRELL, of Westerly, in the county of Washington and State of Rhode Island.

My invention consists in improving the construction of pistons which are reciprocated in cylinders and employed to form air-cushions, to arrest at each movement the reciprocating table of a printing-press bed. The object is to prevent stoppage by a paper getting between the piston and cylinder, and to allow the piston to be wholly withdrawn from the cylinder and yet readily re-entered, which I seek to accomplish by providing a flexible packing adapted for pistons which wholly withdraw from the cylinders that are open at one end and enter again at the time of action, and having such a large measure of flexibility that a wad of paper or the paper-carrying tapes will not wedge in and stop the press and burst the cylinders, as sometimes happens with the inflexible pistons always heretofore used in air-spring mechanism of printing-presses, which said inflexible pistons were used for the want of any known construction of sufficiently flexible packing adapted to pistons wholly escaping from the cylinder and entering again at each double motion. Thus it will be easily relieved of any obstruction.

Figure 1:
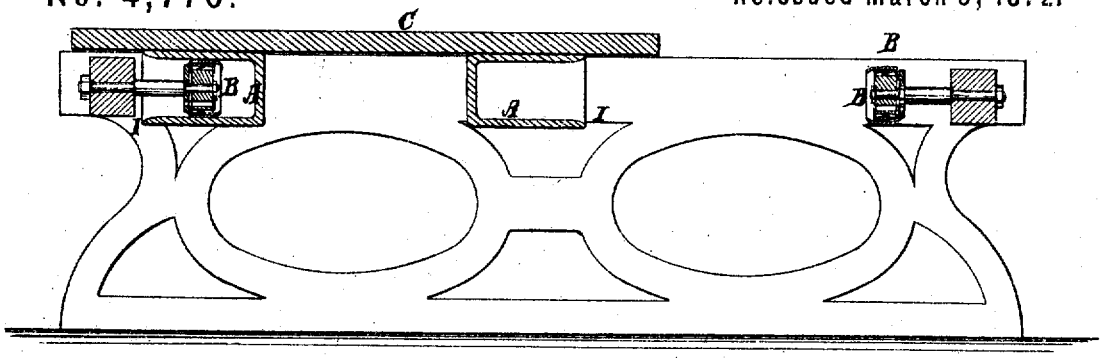
Figure 2:
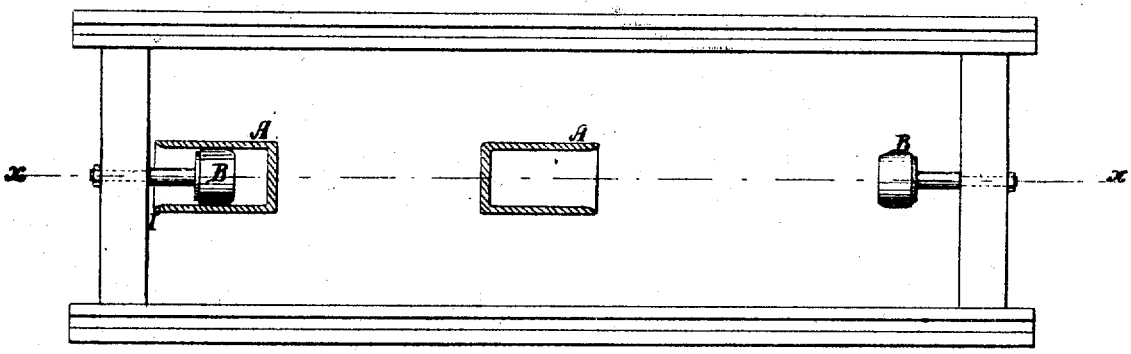
Figure 3:
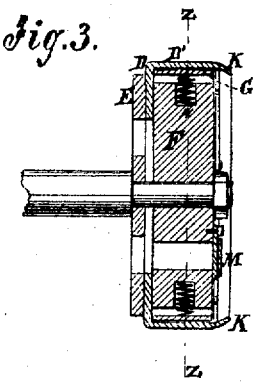
Figure 4:
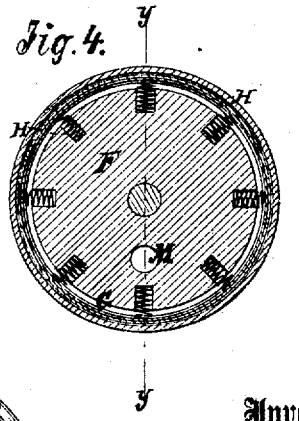
Figure 5:
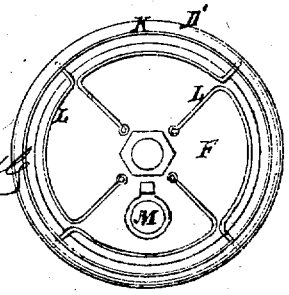

Figure 1 is a longitudinal section of a part of a printing-press on the line *x x* of Fig. 2, showing my improvement. Fig. 2 is a horizontal section. Fig. 3 is a section through the piston on the line *y y* of Fig. 4. Fig. 4 is a section on the line *z z* of Fig. 3; and Fig. 5 is a side elevation of the piston.

Similar letters of reference indicate corresponding parts.

A represents the cylinders, and B the pistons employed in these presses to effect the stoppage of the table by the compression of the air in the cylinders behind the pistons. Heretofore the pistons have been solid, or, at least, so unyielding that the paper falling in front of a cylinder so as to be forced into it would pack so hard as to stop the press, requiring great force to release the piston, and sometimes breaking the cylinder and other parts. Now, I propose to construct these pistons with such capacity for yielding radially that the packing which works against the wall of the cylinder will yield when any such matters are encountered by the piston, so as not to obstruct the working of the press. This I propose to accomplish by a leather or other flexible packing, D, clamped between wood or metal disks E F, which are considerably smaller than the cylinder and shaped in cylindrical form in the part D′, which acts upon the cylinder, which part I stretch or adjust over a flat coiled spring, G, or other equivalent support therefor, arranged on the periphery of disk F, and sustained a considerable distance therefrom by the radial coiled springs H, or in any other way, so that the said spring G or other device or devices used instead may have considerable movement radially when required. The coiled flat spring G may be sufficiently strong to hold the elastic packing against the cylinder with sufficient pressure without the aid of the springs H, which will be needed more in case segmental plates or blocks of any kind be used instead of the spring G. The flexible packing D′ will be contracted a little at the side of the piston which enters the cylinder first, as shown at K, to prevent catching on the rim of the cylinder, and the latter will be reamed out, as at I, for the same object. In this example I have represented spring-pins L, attached to the side of the piston for holding the spring G from escaping by their radial points passing through a flange of the disk F and projecting in front of the edge of said springs. The pistons will be provided with a valve, M, to admit air behind them, when withdrawing, to supply the place of that escaping past the packing when the piston goes in, to prevent the action of a vacuum against the piston when withdrawing.

The plan of arresting the tables of printing-presses by air-spring mechanism, at first received with great favor, is now scarcely used at all, in consequence of the delay and damage resulting from this very difficulty I seek to overcome, which is found to be wholly avoided by the practical operations of several machines with my improvements for a long time in operation.

Having thus described my invention, I claim as new and desire to secure by Letters Patent—

1. A flexible packing, D D′, clamped between disks and expanded by a flat spring, G, coiled around the disk F, as described, for the purpose set forth.

2. The flexible packing D D′, the flat spring G, the spring-pins L, and the auxiliary springs H, all combined and applied together as and for the purpose set forth.

3. In combination with the piston of the air-spring mechanism of a printing-press, I claim a flexible packing, constructed and arranged substantially as hereinbefore described.

CALVERT B. COTTRELL.

Witnesses:
T. B. MOSHER,
GEO. W. MABEE.